United States Patent

[11] 3,601,182

| [72] | Inventors | Vemulapalli Durganageswar Rao<br>Woodhaven, Mich.;<br>John J. Trudeau, Avon, N.C.; Jerry E.<br>White, Dearborn Heights, Mich. |
|---|---|---|
| [21] | Appl. No. | 854,398 |
| [22] | Filed | Sept. 2, 1969 |
| [45] | Patented | Aug. 24, 1971 |
| [73] | Assignee | Ford Motor Company<br>Dearborn, Mich. |

[54] RIM CONSTRUCTION FOR GAS TURBINE ROTATING HEAT EXCHANGERS
14 Claims, 5 Drawing Figs.

[52] U.S. Cl. .................................................. 165/9,
165/10, 277/96
[51] Int. Cl. ............................................... F28d 19/00
[50] Field of Search ................................... 165/9, 10;
277/96

[56] References Cited
UNITED STATES PATENTS
2,615,685  10/1952  Bowden et al. .............. 165/10

3,391,727  7/1968  Topouzian .................... 165/9
3,392,776  7/1968  Topouzian .................... 165/10 X
FOREIGN PATENTS
728,192  4/1955  Great Britain

*Primary Examiner*—Albert W. Davis, Jr.
*Attorneys*—John R. Faulkner and Glenn S. Arendsen ABSTRACT: Inserts of low-friction material such as boron nitride or graphite are positioned in an undercut on the periphery of a circumferentially continuous disc type regenerator and are bonded to the regenerator by a resilient adhesive such as a silicone rubber. The inserts preferably protrude beyond the outer circumference of the regenerator and the adhesive is applied to the outer circumference and the projecting surface of the inserts. Joints at the ends of the inserts attach the inserts together to form a substantially continuous rim capable of absorbing thermal expansion without opening radial leakage paths.

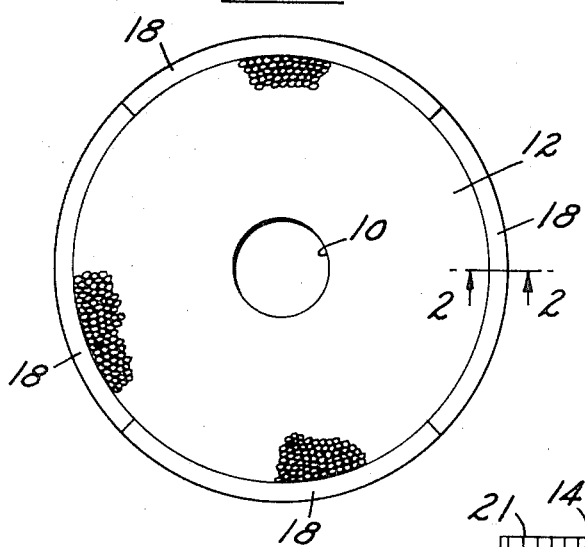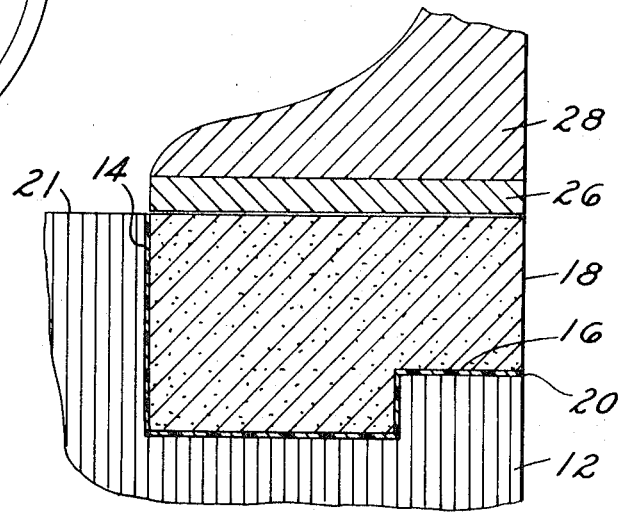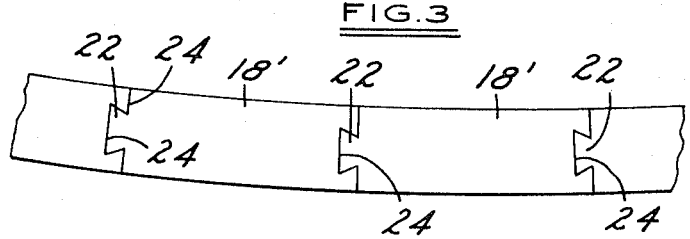
VEMULAPALLI DURGANAGESWAR RAO
JOHN J. TRUDEAU
JERRY E. WHITE
INVENTORS 3,601,182

RIM CONSTRUCTION FOR GAS TURBINE ROTATING HEAT EXCHANGERS

BACKGROUND OF THE INVENTION

Rotary regenerators for gas turbine engines now are being made of ceramic materials capable of effective heat transfer at elevated temperatures. Typical ceramic materials useful in such regenerators include petalite, glass ceramics, spodumene, etc. and are sold as Cercor by the Corning Glass Company. Ordinary metal seals generally are incapable of surviving for reasonable periods at the operating temperatures intended for such ceramic regenerators. Excessive wear of the ceramic regenerator also poses some very difficult problems. Exotic seal materials made by plasma spraying various metallic halides and oxides onto a steel substrate are capable of proper operation at the temperatures involved and reduce regenerator wear considerably. Such seals are relatively expensive, however, and in many cases do not produce a gas turbine engine assembly having a maintenance-free life comparable to that of an internal combustion engine.

SUMMARY OF THE INVENTION

This invention provides a rotatable heat exchanger for a gas turbine engine that has minimal wear and low friction and absorbs some of the dimensional changes generated by temperature gradients in the regenerator. The heat exchanger comprises a plurality of low-friction members fastened to the periphery of a circumferentially continuous regenerator to form a substantially continuous rim. The regenerator periphery preferably contains an undercut and the members are inserts fitting into the undercut so the surfaces of the inserts are coplanar with the surface of the regenerator. The inserts are connected to each other by joints having at least one surface angled with respect to a radius of the regenerator. Such joints include lap joints, mortise and tenon joints, tongue and groove joints, etc. which permit some circumferential movement of the inserts while preventing radial leakage paths.

The inserts can be fastened to the regenerator by adhesives that have suitable high temperature properties and retain some resiliency after curing. Silicone rubbers are typical of the useful adhesives. In disc-type heat exchangers, the inserts preferably extend slightly beyond the outer circumference of the regenerator and the adhesive is applied only to the corner formed between the projecting ledge of the inserts and the regenerator periphery where a cooler environment exists. An outward slope on the radially inner surfaces of the inserts and a circumferential spring in a groove in the radially outer surfaces of the inserts can be used to assist in maintaining the inserts in place.

A complete rim made up of a minimum of three to four inserts has good ability to absorb thermal expansion differences without distorting or placing undue stresses on the regenerator, the inserts, or the adhesive. Rims made up of about eight to 30 inserts in disc-type regenerators having peripheries of about 80 inches provide an excellent combination of manufacturing feasibility and dimension absorbing ability. The inserts are made of materials having low friction and wear at the expected operating temperatures. In typical automotive gas turbine engines, the regenerator periphery operates at about 400°–700° F. and inserts of graphite or boron nitride are useful. Inserts made of metallic oxides and halides are useful in higher temperature environments.

BRIEF DESCRIPTION OF THE DRAWINGS

FIG. 1 is a top view of a disc-type regenerator showing four rim inserts forming a substantially continuous rim at the exterior periphery of the regenerator.

FIG. 2 is a sectional view taken along line 2—2 of FIG. 1 showing a cross section of the undercut at the periphery of the regenerator. The inserts of FIG. 2 are bonded to the regenerator at the axial and radial interfaces.

FIG. 3 is a top view of an alternate set of inserts showing a dovetail construction used to connect the members into a substantially continuous rim having minimal radial leakage.

FIG. 4 also shows a half lap joint useful at the ends of the inserts; thermal expansion can separate the ends of the inserts as shown but the inserts maintain contact with each other at the circumferential surfaces of the joints to block radial leakage.

DETAILED DESCRIPTION

Figure 4:
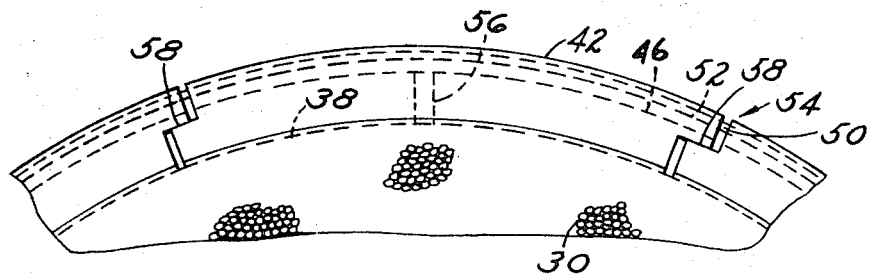
FIGS. 4 and 5 show an installation in which the inserts project slightly beyond the outer circumference of the regenerator and are bonded to the regenerator at the outer circumference only.

Referring to FIG. 1, a disc-type regenerator of this invention has a central hub 10 surrounded by a porous circumferentially continuous core 12. Core 12 has a plurality of closely adjacent gas flow passages for conducting gases through the heat exchanger substantially parallel to the rotational axis of the regenerator.

As shown in FIG. 2, the outer periphery of core 12 contains an undercut 14 having an L-shaped cross section. The depth of the undercut at the extreme periphery of the core is less than the depth of the undercut at a location radially inward from the periphery by virtue of the step 16.

A plurality of insert members 18 having cross-sectional shape corresponding to the cross section of undercut 14 are fastened into the undercut by a bonding material 20 applied to the interfaces thereof. A total of four inserts are used to form an entire rim of the inserts. Typical bonding materials include thermoplastic materials such as silicone rubbers obtainable from Dow Corning Corporation or polyarylsulfones obtainable from the 3M Company. The thickness of the bonding material is sufficient to absorb some of the thermally induced dimensional changes between the core 12 and the inserts 18. Axial faces of the inserts are substantially coplanar with an axial face 21 of the regenerator core.

One end of each insert 18' in FIG. 3 contains a tenon 22 and the other end of the insert contains a corresponding mortise 24. The tenons fit into the mortises to from a structurally integral rim for the regenerator. Tenons and mortises can be dovetailed as shown in FIG. 3 or can have any of a number of various shapes.

The regenerator is mounted in a gas turbine engine with the faces of insert members 18 bearing against a peripheral seal 26 that is stationary with respect to the gas turbine housing 28. During rotation of the regenerator, the rim made up of insert members 18 rides on seal 26. Thermally induced dimensional changes are absorbed by the resilient nature of the bonding material assisted by the ability of individual inserts to flex slightly in a manner independent of the other inserts.

Figure 5:
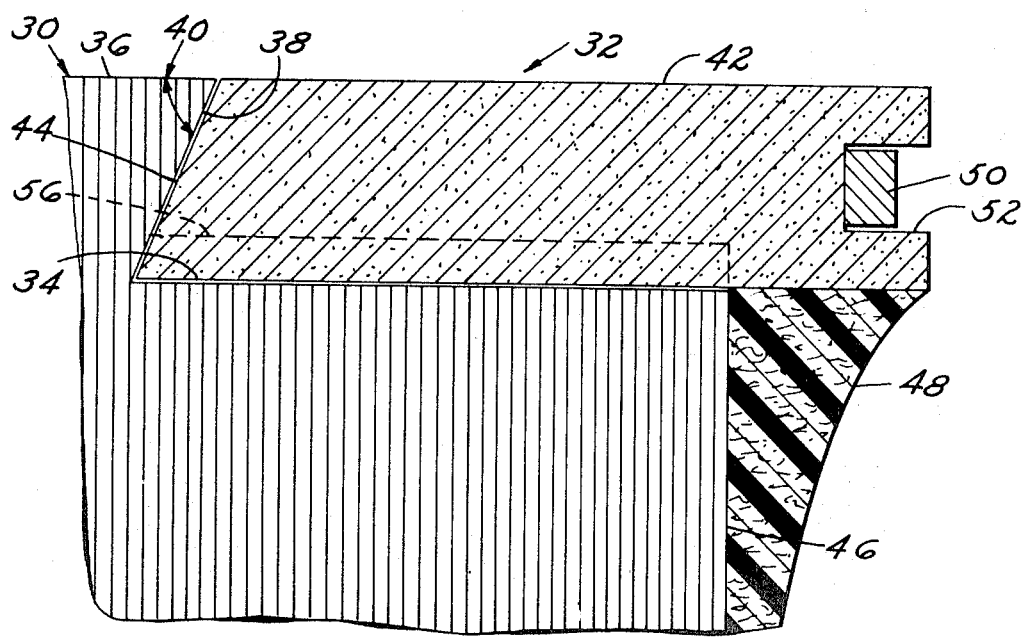

Turning to the regenerator shown in FIGS. 4 and 5, a disc-type regenerator core 30 has a peripheral undercut 32 that has a planar surface 34 parallel to the axial face 36 of the core. The radially inner surface 38 of undercut 32 slopes outwardly to form an acute angle 40 with axial face 36. A plurality of inserts 42 are located in undercut 32. The inner surface 44 of each insert has a slope corresponding to the slope of surface 38 and each insert projects slightly beyond circumferential face 46 of core 30.

A bonding material 48 such as silicone rubber fills the corner formed by the projecting surface of the inserts and the circumferential face 46 of the core but no bonding material is applied to surfaces 34 and 38. The bonding material generally is sufficient to resist centrifugal loads applied to the inserts and maintains surface 44 closely adjacent to surface 38. If desired, a circumferential spring 50 can be located in a groove 52 formed in the circumferential periphery of the inserts to assist the bonding material in holding the inserts in place.

The ends of the inserts have a half lap joints as indicated by numeral 54 in FIG. 4. These joints include peripherally spaced radial surfaces connected by a surface 58 angled relative to a radius of the core. A radial ridge 56 of the material of core 30 can be located on surface 34 to absorb circumferential forces applied to the inserts. During engine operation, the axial faces of the inserts ride on a peripheral seal as illustrated in FIG. 2 to produce low friction contact. Thermally induced dimension changes can cause the entire rim to move radially outward slightly which separates the ends of the inserts at the radial surface as shown in FIG. 4. The resilient nature of bonding material 48 permits such slight movement but maintains surfaces 58 of the joints 54 in contact with each other to minimize radial leakage through the rim.

Thus this invention provides a rim construction for a gas turbine heat exchanger that has minimal friction and wear and retains sufficient flexibility to absorb differences in thermal expansion. The rim construction is relatively easy to build and assemble and assists considerably in providing a highly efficient heat exchanging system for automotive gas turbine engines.

I claim:

1. A rotatable heat exchanger for a gas turbine engine comprising a circumferentially continuous core having a plurality of gas flow passages for conducting gases through the heat exchanger, and a plurality of members fastened to the periphery of said core to form a substantially continuous rim, said rim providing a low friction, low wear rubbing surface for said core.

2. The heat exchanger of claim 1 in which the axial faces of the members are substantially coplanar with the axial face of the core.

3. The heat exchanger of claim 2 in which the core periphery contains an undercut and the members are inserts fitting into the undercut.

4. The heat exchanger of claim 3 in which the core is a disc made of a ceramic material and the undercut has an L-shaped cross section, the lateral depth of said undercut at the extreme periphery of the core being less than the lateral depth of the undercut at a location radially inward from the periphery, said inserts having an L-shaped cross section conforming in shape to the cross section of the undercut.

5. The heat exchanger of claim 4 in which the inserts are joined together by joints including a surface angled with respect to a radius of the core.

6. The heat exchanger of claim 5 in which the joints attaching the inserts to each other are mortise and tenon joints with one end of each insert containing a tenon and the other end of each insert containing a corresponding mortise.

7. The heat exchanger of claim 5 in which the joints attaching the inserts to each other are half lap joints with the surfaces of the joint being parallel to the axis of the core.

8. The heat exchanger of claim 3 in which the inserts are joined together by joints including a surface angled with respect to a radius of the core, said joints being half lap joints with the surfaces of the joints being parallel to the axis of the core.

9. The heat exchanger of claim 1 comprising about eight to 30 inserts, said inserts being made of graphite or boron nitride.

10. A gas turbine engine including a housing, seal means mounted in said housing, and a circumferentially continuous heat exchanger mounted rotatably in said housing and having a peripheral portion sliding on said seal means, said heat exchanger comprising a plurality of narrow walls defining a plurality of closely adjacent gas flow passages, and a plurality of members fastened to the periphery of said heat exchanger where said members form a substantially continuous rim that contacts said means, said members being made of materials having a low coefficient of friction and a low wear rate when rubbing against the seal means.

11. The engine of claim 10 in which the heat exchanger periphery contains an undercut and the members are inserts fitting into the undercut, the axial faces of said inserts being substantially coplanar with the axial face of the heat exchanger.

12. The engine of claim 11 in which the heat exchanger is a disc made of ceramic material and the inserts extend beyond the circumferential face of the heat exchanger and comprising a bonding material fastening the projecting surface of each insert to the circumferential face of the heat exchanger.

13. The engine of claim 12 in which the radially inner surface of the undercut slopes outwardly to form an acute angle with the axial face of the heat exchanger and the inner surface of each insert has a corresponding slope.

14. The engine of claim 13 comprising spring means positioned at the outer circumference of the inserts, said spring means extending around the circumference of the inserts and exerting forces on each insert that urge the inserts radially inward.